US005102078A

United States Patent [19]

Nordeng

[11] Patent Number: 5,102,078

[45] Date of Patent: Apr. 7, 1992

[54] BRACKET KIT

[76] Inventor: LeRoy Nordeng, R.R. 2, Box 158 J, Zumbrota, Minn. 55992

[21] Appl. No.: 639,884

[22] Filed: Jan. 11, 1991

[51] Int. Cl.[5] ............ F16M 11/00

[52] U.S. Cl. ............ 248/166; 182/181; 182/186; 248/440

[58] Field of Search ............ 248/166, 440, 222.4; 182/153, 186, 181; 256/64, 60

[56] References Cited

U.S. PATENT DOCUMENTS 1,213,409 1/1917 Pfeifer ............ 248/166
1,435,738 11/1922 Reiman ............ 248/166 X
2,132,285 10/1938 Brown ............ 182/186
2,638,386 5/1953 Larson ............ 182/181
2,973,053 2/1961 Beaty ............ 182/186 X
3,289,789 12/1966 Larson ............ 182/186 X
3,480,111 11/1969 Larson ............ 182/181 X
3,858,682 1/1975 Larson ............ 182/181 X
4,325,463 4/1982 Taylor ............ 182/181 X
4,461,370 7/1984 Connell ............ 182/153
4,911,390 3/1990 Flick ............ 182/181 X

*Primary Examiner*—David L. Talbott
*Attorney, Agent, or Firm*—Lawrence M. Nawrocki

[57] ABSTRACT

A bracket, sold in kits of two or four, is used with a cross-member and four legs for constructing a saw-horse. The bracket includes an upper end having a slot for receiving the cross-member and abutment flanges against which the legs may be placed for holding the legs in an angled position relative to the cross-member. The legs are pivotally secured to the bracket for swinging between a collapsed non-assembled position and the angled assembled position. Inclined raised ridges on the bracket surround slots which receive fasteners that extend into the legs. The ridges and the heads of the fasteners cooperate to lock the legs to the brackets by wedging the fastener heads against the ridges as the legs are swung into their assembled position.

1 Claim, 1 Drawing Sheet

BRACKET KIT

TECHNICAL FIELD

The present invention relates generally to a kit having at least a pair of brackets for holding a pair of legs in an angled assembled position relative to another member. More particularly, the present invention relates to a kit including four such brackets used in association with cross-member and four legs for constructing a sawhorse.

BACKGROUND OF THE INVENTION

Sawhorses are well known tools used by carpenters and others for woodworking purposes. Each sawhorse typically comprises a horizontal cross-member supported at each end by a pair of legs. The legs are set at an angle to the cross-member to make the sawhorse self-supporting. Two sawhorses are usually spaced apart from one another during use so that cut lumber, or other components on which the carpenter might be working, can be laid across the cross-members and be supported thereby.

At one time many sawhorses would have been individually constructed by a carpenter from suitably sized pieces of lumber nailed or otherwise fixed together. Today, it is more common to use a plurality of preformed brackets, often sold together in kit form, to connect the cross-member and legs of the sawhorse together. Such sawhorse bracket kits have a number of advantages over traditional sawhorses. They require no special skill in mating the legs to the cross-member or in nailing them together—only a simple assembly operation is required. In addition, the sawhorse may be more easily disassembled when this is desired.

U.S. Pat. No. 3,042,144 to Larson discloses a bracket made of a generally planar plate having a slot for receiving the cross-member and two angled sides for receiving the legs. Nails or screws extend through the bracket and into the cross-member and legs for assembling them together into a completed unit, such as a sawhorse. The brackets are used in opposed pairs on either side of the legs. Threaded members are used to clamp the opposed brackets together.

While the bracket kit of Larson can be used to construct a sawhorse, it has a number of disadvantages. First, the nails used to fix the cross-member to the bracket are angled downwardly and are unsupported over a portion of their length before entering the cross-member, i.e. there is a small gap between the cross-member and the bracket flange through which each nail passes. Thus, these nails tend to work loose over time. The user of the sawhorse often has to keep pounding these nails back into place and the nails stay in place for progressively shorter lengths of time. This is annoying. Longer nails can be used, but there is a limit as to how many times this can be done without weakening the structural integrity of the cross-member. As a result, the Larson bracket yields a sawhorse which does not remain firmly fixed together as long as one would like.

In addition, the legs of the sawhorse are secured to the bracket in a fixed manner, basically making the sawhorse non-collapsible. If one wishes to transport the sawhorse, e.g. from one job site to another, and the sawhorse is too big for the vehicle being used, it is necessary to disassemble the sawhorse by removing the legs so that individual components can be stacked together. Of course, this also requires that the sawhorse be reassembled when the new job site is reached. This process is time-consuming and undesirable. In addition, frequent disassembly of the legs gradually taps out the screw or nail holes in the legs, leading to some of the same problems of secure attachment discussed above for the cross-member.

Other brackets have been disclosed for supporting a horizontal cross-member of a sawhorse or similar device. Some of these other brackets often include collapsible legs in which the legs are no longer pieces of lumber but are formed as part of the bracket. However, such brackets are more complex than a simple planar plate, use elaborate pivot structures in some cases, and are, as a result, more expensive to manufacture or buy.

SUMMARY OF THE INVENTION

Accordingly, one aspect of this invention is to provide a simple, durable sawhorse bracket for constructing a sawhorse which is easily collapsible.

A bracket according to the present invention is used in association with a cross-member and a plurality of downwardly extending legs. The bracket comprises an upper end having a slot for receiving at last a portion of the cross-member therein. An angled abutment means is provided against which the upper ends of the legs may be abutted for aligning the legs in an angled assembled position relative to the cross-member. In addition, the bracket includes a means for pivotally attaching each of the legs to the bracket so that the legs may be swung relative to the bracket from a non-assembled position in which the legs are generally vertical and parallel to one another to the angled assembled position in which the legs are engaged against the abutment means. Finally, the bracket includes a means responsive to the pivoting motion of the legs for locking the legs to the bracket in their assembled position but not in their non-assembled position.

BRIEF DESCRIPTION OF THE DRAWINGS

The present invention will be described in more detail hereafter in the Detailed Description, taken with reference to the following drawings, in which like reference numerals refer to like elements throughout.

DETAILED DESCRIPTION

Figure 1:
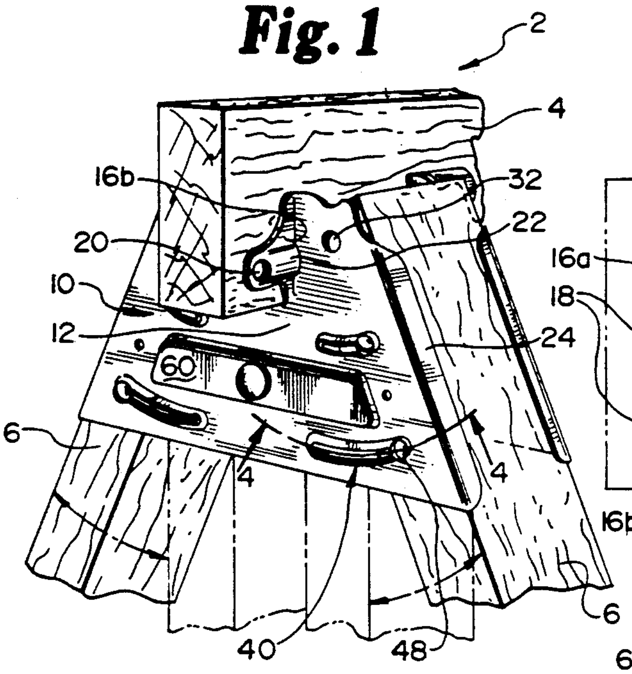
FIG. 1 is a perspective view of one end of a sawhorse constructed using a pair of sawhorse brackets according to the present invention.
Figure 2:
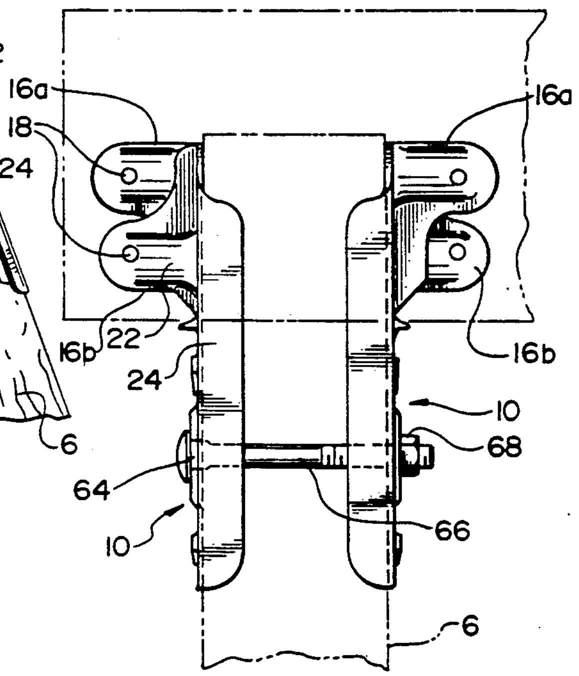
FIG. 2 is a side elevational view of the sawhorse shown in FIG. 1, particularly illustrating the pair of brackets clamped together around the legs of the sawhorse.

Referring now to FIG. 1, one end of a typical sawhorse is illustrated generally as 2 and comprises a cross-member 4 supported by two downwardly extending angled legs 6. The sawhorse will have another end that is the mirror image of end 2 and will not thereafter be specifically discussed. Cross-member 4 and legs 6 are preferably suitably sized pieces of lumber such as 2×4's. However, any suitable components may be used in place of 2×4's.

The present invention relates to a plurality of generally identical sawhorse brackets 10 for connecting legs 6 to cross-member 4. Each bracket 10 comprises a substantially planar face plate 12 having a trapezoidal shape. The upper end of face plate 12 includes a vertical slot 14 sized to receive at least the bottom portion of cross-member 4 therein.

Face plate 12 carries two ears 16*a* and 16*b* which extend perpendicularly out of the plane of face plate 12. Ears 16 are identical except for being vertically offset relative to one another, i.e. ear 16*a* is higher than ear 16*b*. Each ear is located on one side of slot 14 and extends parallel to cross-member 4. In addition, each ear 16 directly abuts against cross-member 4 in a face-to-face manner when cross-member 4 is received in slot 14.

Each ear 16 contains a circular opening 18 for receiving a fastener 20 for securing cross-member 4 to bracket 10. Fastener 20 preferably comprises a nail, a wood screw, or any other suitable securing device. Since ears 16 are vertically offset, fasteners 20 can pass horizontally into cross-member 4 without interfering with one another. When so installed, such members 20 pass directly into cross-member 4 without any gaps or unsupported lengths due to the direct face-to-face abutment of ears 16 with cross-member 4 and the placement of opening 18 in a flat portion of ear 16. In addition, each ear 16 includes a longitudinal rib 22 formed in ear 16 to one side of opening 18 for imparting additional strength to the ear.

Bracket 10 further comprises a pair of flanges 24 on each side thereof which also extend perpendicularly out of the plane of face plate 12, but in the opposite direction from ears 16. Flanges 24 are placed at an outwardly diverging angle relative to slot 14 to serve as guides or abutments for legs 6 to properly align the legs in an assembled position as described in more detail hereafter. Since face plate 12 is formed as a trapezoid, having outwardly diverging sides, it is sufficient for flanges 24 simply to be formed as inturned lips or shoulders on the side edges 26 of face plate 12. However, face plate 12 could have other shapes e.g. rectangular, as long as flanges 24 are still angled relative to slot 14.

Bracket 10 also includes means for pivotally supporting each of the legs 6 on face plate 12. A pivot point defined by a circular hole 30 is located in the upper end of face plate 12 through hole 30 and into the upper end of leg 6. However, screw 32 is not tightened up against the side of face plate 12, but is left somewhat loose relative thereto to act as a pivot rod. Accordingly, legs 6 can be swung from a non-assembled position in which they are parallel to one another and hang vertically in the center of bracket 10, as shown in phantom lines in FIG. 1, to an assembled position where they abut against flanges 24 and extend downwardly at an angle relative to cross-member 4. When all the legs 6 of sawhorse 2 are placed in this assembled position, the sawhorse will be self-supporting.

A locking means is provided for holding legs 6 in their angled, assembled position. The locking means includes a plurality of arcuate slots 40 located in vertically spaced pairs on each side of face plate 12 radially outside slot 14. Slots 40 are sufficiently long to have an inner end 44 lying generally beneath the pivot point formed by hole 30 and an outer end 46 lying adjacent flange 24 to overlie the leg 6 when the leg 6 is placed in its assembled position. Again, a suitable fastener comprising a wood screw 48 extends through each slot 40 and into leg 6. When legs 6 are in their non-assembled position, screws 48 will abut against the radially inner ends 44 of their respective slots 40. Then, when legs 6 are swung out to their assembled position, screws 48 will travel through slots 40 until finally reaching the radially outer ends 46 of slots 48 at approximately the point where legs 6 abut against flanges 24.

Figure 4:
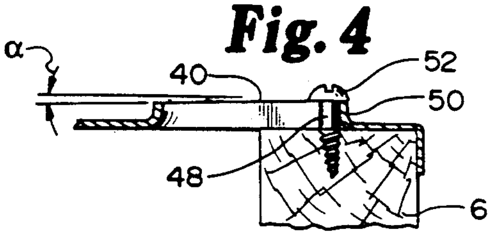
FIG. 4 is a cross-sectional view of a portion of the sawhorse bracket shown in FIG. 1, taken along lines 4—4 in FIG. 1, particularly illustrating the means for locking the legs to the bracket in the assembled position thereof.
Figure 5:
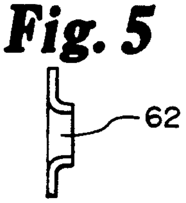
FIG. 5 is a cross-sectional view of a portion of the sawhorse bracket shown in FIG. 1, taken along lines 5—5 in FIG. 3, particularly illustrating a square carriage bolt hole used in conjunction with a carriage bolt for clamping two spaced brackets together around a pair of the sawhorse legs.
Figure 3:
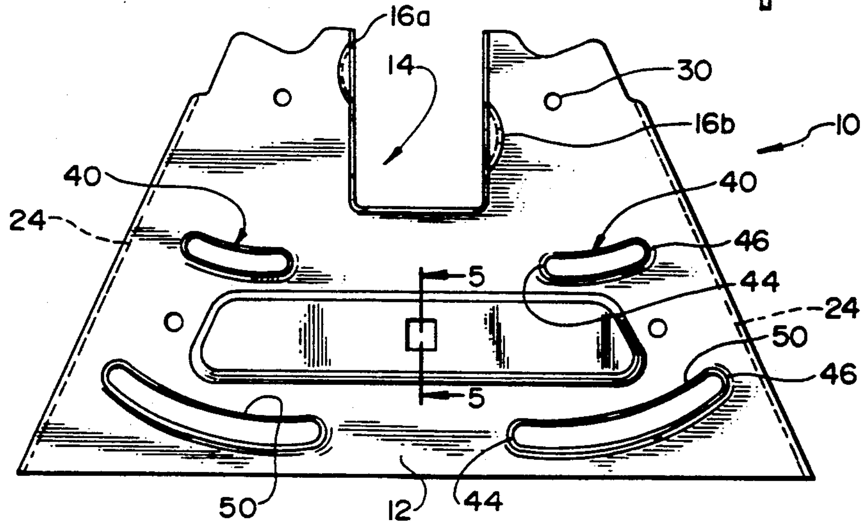
FIG. 3 is a front elevational view of the sawhorse bracket shown in FIG. 1.

Slots 40 are extruded in face plate 12 so as to be surrounded or bounded by a raised ridge 50. Ridge 50 is not constant in height, but gradually increases in elevation between its inner end 44 and its outer end 46. This change in elevation is represented by the incline angle a in FIG. 4. Screw 48 has an enlarged head 52 whose position relative to ridge 50 can be controlled by how deeply screw 48 is screwed into leg 6. Preferably, head 52 is spaced above ridge 50 by a small gap at inner end 44 of slot 40, but is wedged tightly against ridge 50 at outer end 46 of slot 40. This interaction between the raised ridge 50 and the screw head 52 is what locks legs 6 to bracket 10 in their assembled position, but not in the non-assembled position thereof.

Finally, each support bracket 10 includes a horizontal strengthening rib or boss 60 located in the middle of face plate 12 beneath slot 14. Boss 60 is elongated to span across a substantial portion of face plate 12. In addition, boss 60 includes a square hole 62 for non-rotatably receiving therein the square head 64 of a conventional carriage bolt 66. Thus, when two brackets 10 are oppositely disposed on opposed sides of legs 6 to clamp the legs between them, carriage bolt 66 can be inserted through the brackets 10 and a nut 68 can be tightened to clamp brackets 10 together around legs 6. It will be understood that the illustration of a hexagonal nut in the figures is not to be construed as exclusive. The particular type of locking mechanism is not essential to the invention, and it will be understood that a wing nut could serve equally as well to effect clamping of the brackets 10 together. Other locking structures are also contemplated.

It should be apparent by now how brackets 10 are used. One pair of brackets 10 is used to construct each end of the sawhorse. The brackets are disposed around two of the legs 6, can be loosely connected together by carriage bolt 66, and the various screws 32 and 48 can be inserted into the legs 6 to pivotally couple the legs 6 to the brackets. Initially, the legs 6 are left in their collapsed non-assembled position. Carriage bolt 66 can be tightened after this initial loose assembly. Then, the user can simply grab the legs 6 and swing them outwardly to their angled position where they abut against flanges 24. The interaction between ridges 50 and screw heads 52 automatically locks legs 6 in this assembled position simply by virtue of the pivoting motion of the legs 6. At some point in this process, cross-member 4 is dropped into slot 14 and coupled by fasteners 20 to ears 16.

One advantage of brackets 10 is their simple, yet durable, construction. For example, brackets 10 are formed of a single piece of metal, yet the strengthening ribs, e.g. boss 60, ridges 50, ribs 22, give it great strength. In addition, cross-member 4 is securely and directly attached to ears 16 in a fashion minimizing the tendency of fasteners 20 to work loose.

Moreover, legs 6 are pivotally secured to brackets 10 to be quickly collapsible using a simple wood screw as the pivot element. In addition, the arrangement of arcuate slots 40 and the inclined ridges 50 serve in combination with screws 48 as a simple and effective means for locking the legs 6 in place in their assembled position. However, this locking means can be quickly and easily released simply by grabbing legs 6 and rotating them back to their collapsed, non-assembled position shown in phantom in FIG. 1. Thus, a sawhorse constructed using brackets 10 is easily collapsible for transport and can be set up again simply by swinging legs 6 back to their assembled position, all without having to remove legs 6 from the brackets themselves.

While the present invention covers a completed sawhorse constructed from a cross-member 4, four legs 6, and four support brackets 10, it would not normally be sold in such a complete form due to size constraints. Rather, four brackets 10, two carriage bolts 66 and nuts 68, and the requisite number of fasteners 20, 32 and 48 would normally be packaged together and sold in an unassembled kit. The user would buy this bracket kit, would also buy a suitably sized cross-member 4 and legs 6 or cut such elements from stock lumber, and would then use these components to assemble a sawhorse.

It's anticipated that the bracket kit would include enough brackets 10 to build one complete sawhorse (e.g. four brackets). However, it would be possible to package the brackets in kits of two. This would require the user then to buy two such kits to completely construct one sawhorse. Moreover, brackets 10 are not limited for use in building sawhorses, though that is their primary intended purpose. Brackets 10 could be used whenever two legs have to be disposed in an angled supporting orientation relative to a cross-member. Thus, brackets 10 could be used in conjunction with legs 6 to receive a rail on the bottom side of a table at each corner thereof to help support the table in a horizontal orientation.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention. The invention's scope is defined in the language in which the appended claims are expressed.

What is claimed is:

1. A bracket used in association with a cross-member and a plurality of downwardly extending legs, comprising:

(a) an upper end having a slot for receiving at least a portion of the cross-member therein;

(b) means for attaching the legs to the bracket for pivoting about an axis between a non-assembled position, in which the legs are generally vertical and parallel to one another, and an angled, assembled position;

(c) an arcuate slot, associated with a corresponding leg, formed in the bracket, said slot defining an arc through which a point on the corresponding leg moves as the leg is pivoted between its non-assembled position and its angled, assembled position;

(d) an extrusion surrounding each slot and extending generally perpendicular to a plane defined by the bracket, the dimension of an extrusion in a direction perpendicular to the plane of the bracket increasing from an inner end of the slot, proximate the corresponding leg when in its non-assembled position, and an outer end of the slot, proximate the corresponding leg when in its assembled position; and (e) a fastener passing through a corresponding slot and into a corresponding leg, said fastener having an enlarged head spaced from the corresponding leg at a distance greater than the dimension of said extrusion at said first end of said slot, and slightly smaller than the dimension of said extrusion at said second end of said slot;

(f) wherein, as a leg is moved from its non-assembled position to its angled, assembled position, said extrusion becomes wedged between the corresponding leg and corresponding fastener head.

* * * * *